United States Patent
Mumaw et al.

(10) Patent No.: US 9,540,117 B2
(45) Date of Patent: Jan. 10, 2017

(54) FAILURE ANALYSIS SYSTEM

(71) Applicant: THE BOEING COMPANY, Chicago, IL (US)

(72) Inventors: Randall J. Mumaw, Seattle, WA (US); Roger Nicholson, Seattle, WA (US); Lars Fucke, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 188 days.

(21) Appl. No.: 14/490,458

(22) Filed: Sep. 18, 2014

(65) Prior Publication Data
US 2015/0344149 A1 Dec. 3, 2015

(30) Foreign Application Priority Data
Oct. 9, 2013 (EP) ..................................... 13382400

(51) Int. Cl.
*B64D 45/00* (2006.01)
*G07C 5/08* (2006.01)
*G05B 23/02* (2006.01)

(52) U.S. Cl.
CPC ............ *B64D 45/00* (2013.01); *G05B 23/027* (2013.01); *G05B 23/0251* (2013.01); *G07C 5/0808* (2013.01); *G07C 5/0816* (2013.01); *G07C 5/0841* (2013.01); *B64D 2045/0085* (2013.01); *G05B 2219/45071* (2013.01)

(58) Field of Classification Search
CPC ............ B64D 45/00; B64D 2045/0085; G07C 5/0816; G07C 5/0841; G07C 5/0808
USPC ....................................................... 701/33.4
See application file for complete search history.

(56) References Cited

U.S. PATENT DOCUMENTS

2008/0297333 A1\* 12/2008 Khuzadi ................ G05B 17/02
  340/438
2010/0049379 A1   2/2010 Vial
2010/0161157 A1   6/2010 Guilley et al.
  (Continued)

FOREIGN PATENT DOCUMENTS

EP   1455313 A1   9/2004
EP   2207072 A2   7/2010

OTHER PUBLICATIONS

Extended European Search Report, Patent Application No. 13382400.3-1802, Mar. 3, 2014.

*Primary Examiner* — Brian P Sweeney
(74) *Attorney, Agent, or Firm* — Vista IP Law Group LLP; Cynthia A. Dixon

(57) ABSTRACT

A failure analysis system for monitoring sub-system failures in an aircraft that comprises a plurality of sub-systems, the aircraft having a plurality of functions, wherein each function is available when one or more associated sub-systems is operating correctly. The failure analysis system comprising: a plurality of monitors for monitoring the status of one or more sub-systems of the aircraft and determining if a failure has occurred; a memory arranged to store a list of a plurality of flight phases or operating modes to be completed by the monitored system and data associating one or more of the functions with each flight phase or operating mode; and a processor in communication with the monitors and the memory and arranged to model the response of the sub-systems to a failure determined by the monitors to identify which functions required by the flight phases or operating modes are degraded or are not available.

16 Claims, 5 Drawing Sheets

(56) References Cited

U.S. PATENT DOCUMENTS

2011/0202208 A1* 8/2011 Karnik ................. G07C 5/0841
                                                        701/7
2013/0304307 A1* 11/2013 Safa-Bakhsh .......... G07C 5/006
                                                        701/31.4

* cited by examiner

FAILURE ANALYSIS SYSTEM

CROSS-REFERENCE TO RELATED APPLICATION

This application claims priority to and the benefit of European Patent Application No. EP 13382400.3, filed on Oct. 9, 2013, the entire disclosure of which is expressly incorporated by reference herein.

FIELD

The present invention relates to an airplane function oriented failure analysis system for identifying the consequences of failures of aircraft systems or of parts or components of the aircraft (for example, failures of physical aircraft systems or of physical parts or components of the aircraft). Such parts or components are referred to herein as sub-systems. Failures can, for example, cause the aircraft to lose functionality needed during flight. Particularly, but not exclusively, the invention relates to a failure analysis system for an aircraft, which is arranged to predict when aircraft functions are not available or will not be available owing to determined failures of sub-systems. In preferred embodiments, the failure analysis system is arranged to report to a user, such as a pilot, the failures and/or their consequences.

BACKGROUND

Typically, alerts are triggered on an aircraft in response to a physical system failure. Such alerts merely notify a pilot that the system has failed and may not provide any guidance as to that system's relevance to the continued safe operation of the aircraft.

An aircraft comprises a large number of interconnected sub-systems that may co-operate as a highly integrated system to enable the complete functionality of the aircraft. Since many sub-systems are connected with others, when a sub-system fails, it can be very difficult for a flight crew to ascertain how that failure will propagate through the aircraft and affect overall functionality.

For example, the failure of a sub-system for sensing radar altitude can affect the correct functioning of an auto-throttle system and thrust reversers and affect the function of stopping on the ground, while loss of a sub-system for providing hydraulic pressure can affect the operation of ground spoilers, wheel braking, reverse thrust and rudder yaw control and thus affect the functions of stopping and steering on the ground.

System integration levels are increasing on newer system, increasing the burden on the operator to reason through the effects of a sub-system failure. Accordingly, there is a need to provide an alert system that aids the (operator) pilot in knowing how the sub-system failures remove or degrade important system-level or aircraft functions.

SUMMARY

According to a first aspect of the invention, there is provided a failure analysis system for monitoring sub-system failures in an aircraft that comprises a plurality of sub-systems, the aircraft having a plurality of functions, wherein each function is available when one or more associated sub-systems is operating normally, the failure analysis system comprising: a plurality of monitors for monitoring the status of one or more sub-systems of the aircraft and determining if a failure has occurred; a memory arranged to store a list of a plurality of flight phases or operating modes to be completed by the monitored system and data associating one or more of the functions with each flight phase or operating mode; and a processor in communication with the plurality of monitors and the memory and arranged to model the response of the sub-systems to a failure determined by the monitors to identify which functions required by the flight phases or operating modes are degraded or are not available.

According to a second aspect of the invention, there is provided a failure analysis method for monitoring an aircraft that comprises a plurality of sub-systems, the aircraft having a plurality of aircraft functions, wherein each function is available when one or more associated sub-systems is operating normally, the method comprising the steps of: storing a list of a plurality of flight phases or operating modes to be completed by the aircraft and data associating one or more of the functions with each flight phase or operating mode; monitoring at least one sub-system of the aircraft; determining a failure of one or more of the at least one monitored sub-system; modelling the response of the plurality of sub-systems to the determined failure; identifying which functions are not available or are degraded; and determining whether one or more of the functions associated with each of the plurality of flight phases or operating modes is degraded or not available.

Embodiments of the invention can anticipate system effects that are generated by failures of sub-systems. Furthermore, embodiments can anticipate cascading effects of sub-system failures since (as explained below) the failure analysis system can determine when a further monitored sub-system or an un-monitored further sub-system cannot support one or more of the airplane functions because of the failure of another sub-system.

The determination of functions that are not available can aid the operator's (pilot's) understanding of the faults.

The operator (pilot) can use such information to revise or modifying the mission plan.

In preferred failure analysis systems, the sub-systems may include one or more of: powerplants and associated thrust reversers; a high lift system with trailing edge; flaps and leading edge devices such as slats; ground spoilers; and wheel brakes.

These sub-systems may contribute to the aircraft function for stopping on the runway.

These sub-systems may include one or more of: sensors, processors, actuators, linking elements, indicators, and other aircraft resources (electrical power, hydraulics, cooling etc.).

In preferred failure analysis systems, the plurality of operating modes or functions may include one or more of: take-off; climb; cruise; descent; approach; landing; emergency descent; evacuation; and smoke and fumes protection and removal.

In preferred failure analysis systems, the plurality of aircraft functions may include one or more of: providing control in the air; providing control on the ground (for example, stopping on the runway); communication, navigation, surveillance and air traffic management functions; managing aircraft systems; providing lift and drag control; and maintaining a breathable environment in the aircraft.

Preferred embodiments can aid the (operator) pilot in knowing how the sub-system failures interact to remove or degrade important system-level or aircraft functions.

DRAWINGS

For a better understanding of the invention and to show how the same may be put into effect reference is now made, by way of example only, to the accompanying drawings in which.

DESCRIPTION

Figure 1:
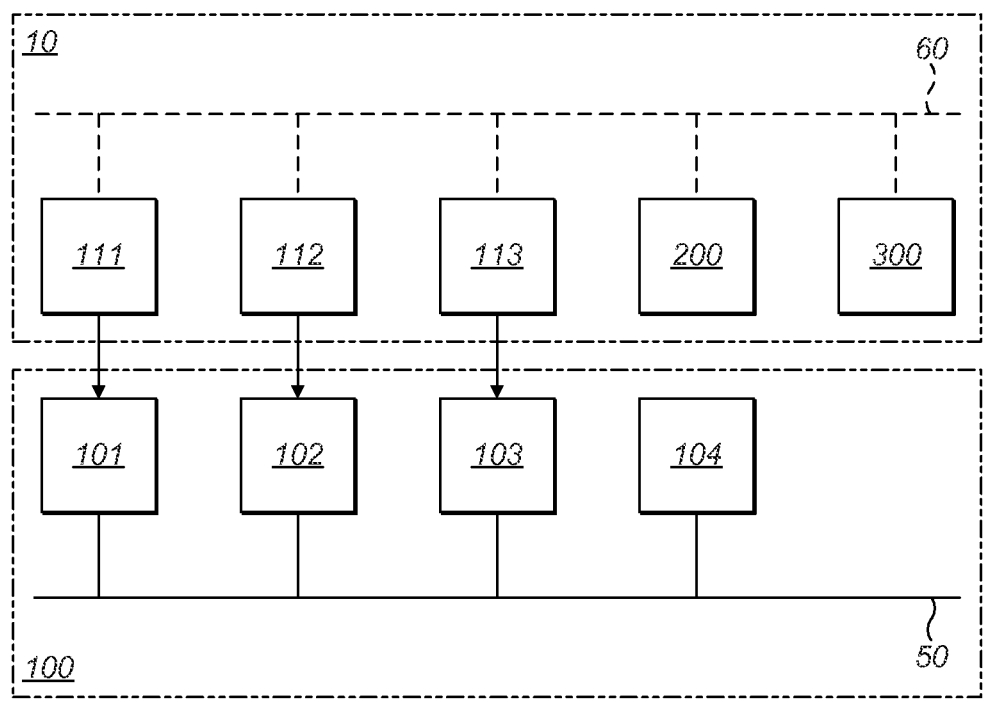
FIG. 1 shows a schematic representation of a first embodiment of a system.

A first embodiment of the invention is shown in FIG. 1.

The aircraft 100 comprises a plurality of sub-systems 101, 102, 103.

Each sub-system 101, 102, 103 can support one or more aircraft functions that are available when the respective sub-system 101, 102, 103 is operating correctly.

The functions of the sub-systems 101, 102, 103 may enable performance of flight phases or operating modes (preferably, in a safe and effective way).

For example, each sub-system 101, 102, 103 may be a sub-system of an aircraft (such as a transport category airplane). Sub-system 101 may control deployment or thrust reverse. Sub-system 102 may include the aircraft wheel breaking system. Sub-system 103 may control deployment of the ground spoilers on the wing. In this example, a critical aircraft function is to stop on the ground after landing, which is supported by each of these three sub-systems. Each contributes to the aircraft's ability to stop in the required distance. When one of these sub-systems fails, the function of stopping on the runway surface may be degraded or may not be possible. The systems and methods described herein allow alerting to be directed to the loss of functionality instead of the conventional approach of focussing on the failed or correct operation of each sub-system.

Of course, the aircraft functions contributed to by at least sub-system 103 (for example, where wing panels are used as ground spoilers on the ground and speed brakes in the air) will be needed during other phases of flight and will therefore be relevant to other important aircraft functions (such as increasing the rate of descent).

A failure analysis system 10 may comprise a plurality of monitors 111, 112, 113 for monitoring the status of the sub-systems 101, 102, 103.

One or more monitors 111 may comprise a sensor for sensing a physical parameter of a sub-system 101. For example, a sub-system that provides hydraulic pressure may be monitored by a monitor comprising a pressure sensor, whereas a sub-system including an engine may be monitored by a monitor comprising a sensor that measures the rotational speed of the engine.

One or more monitors 111 may monitor a sub-system that has a self-diagnosis function, which outputs a signal to indicate whether it is a working or non-working state. In such cases, the monitors may simply monitor the signal.

One or more monitors 111 may be fully, or at least partially, software-based and monitor the operation of a sub-system that is software-based.

One monitor 111, 112, 113 may be provided for each of a set of sub-systems 101, 102, 103, or multiple monitors 111, 112, 113 may collectively monitor one or more sub-systems 101, 102, 103. Furthermore, one or more monitors 111, 112, 113 could be provided for a sub-system 101, 102, 103, in order to provide redundant monitoring. For example, a safety critical sub-system 101, 102, 103 may have two or more monitors 111, 112, 113.

Further sub-systems 104 may be provided without associated monitors.

Each monitor 111, 112, 113 is arranged to determine if a failure has occurred in its associated sub-system(s) 101, 102, 103.

Each monitor 111, 112, 113 can output a signal indicative of a failure of the associated sub-system(s) 101, 102, 103.

Figure 3:
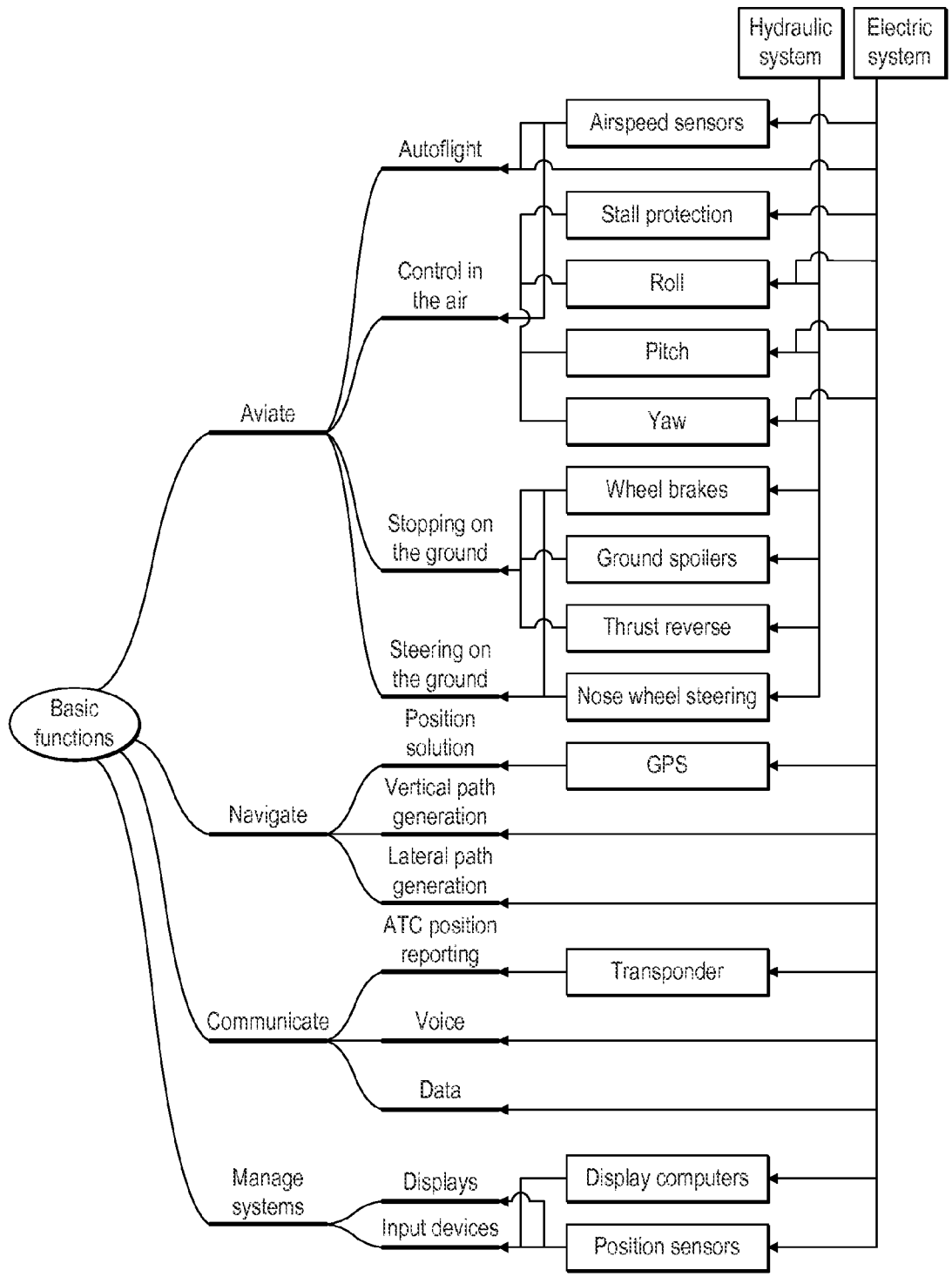
FIG. 3 shows a schematic representation of some of the functions of an aircraft and the systems required to carry them out.

FIG. 3 depicts an exemplary set of aircraft functions that may be required in order to complete the various flight phases or operating modes required by a mission plan. Other functions may be provided. The mission plan may be represented as an ordered list of the flight phases or operating modes.

FIG. 3 also shows three examples of aircraft systems that are required for certain functionality. Other systems may be provided.

A plurality of subsystems 101, 102, 103 may be required to perform all functions required in the various flight phases or operating modes.

Figure 4:
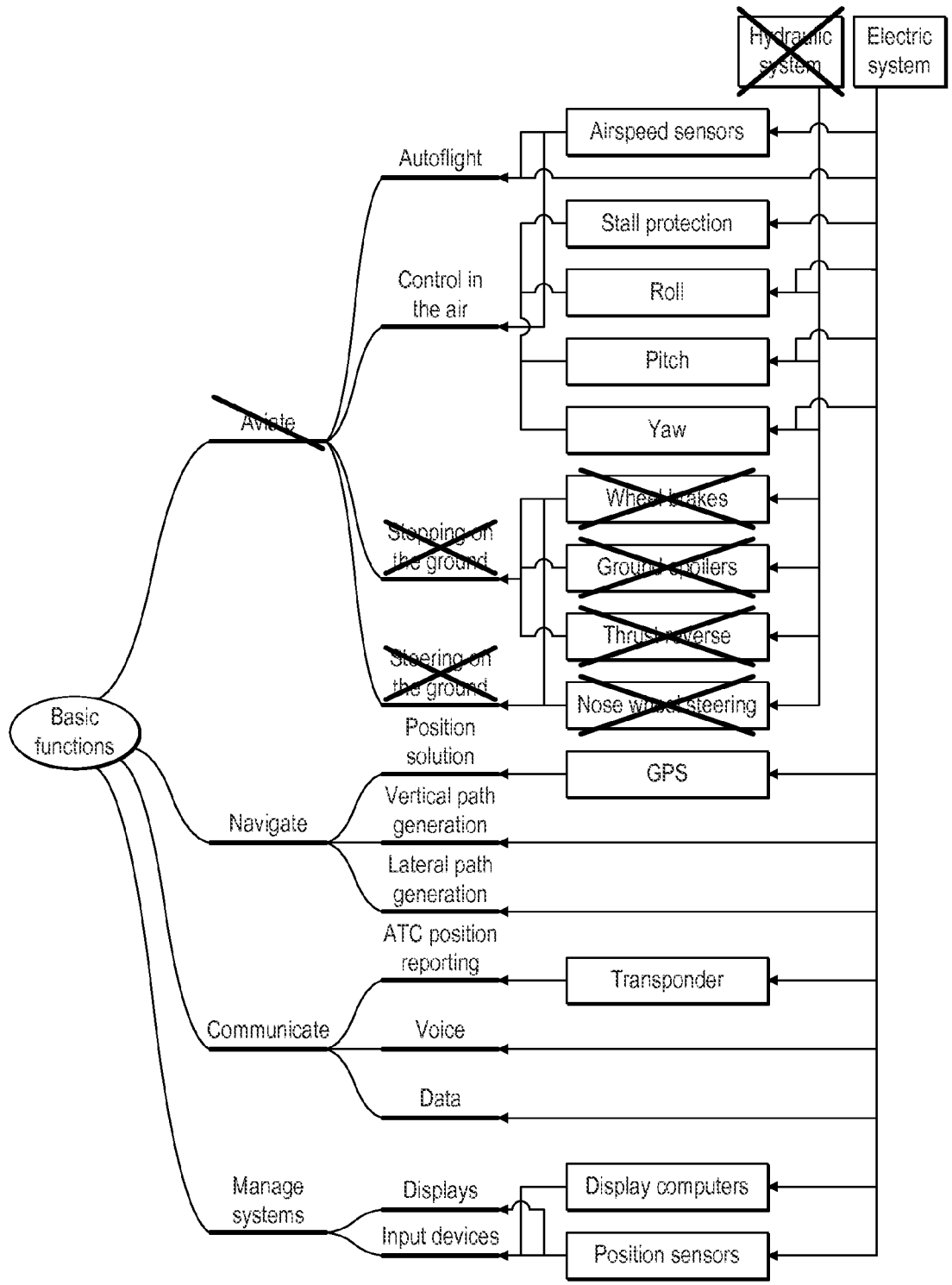
FIG. 4 shows an example of how failures can lead to certain functionality being unavailable.

FIG. 4 shows an example of how failures can lead to certain functionality being degraded or unavailable. In the example of FIG. 4, a sub-system of the aircraft hydraulic system has failed, leading to a degradation of the aircraft functions "aviate", "steering on the ground" and "stopping on ground".

Figure 5:
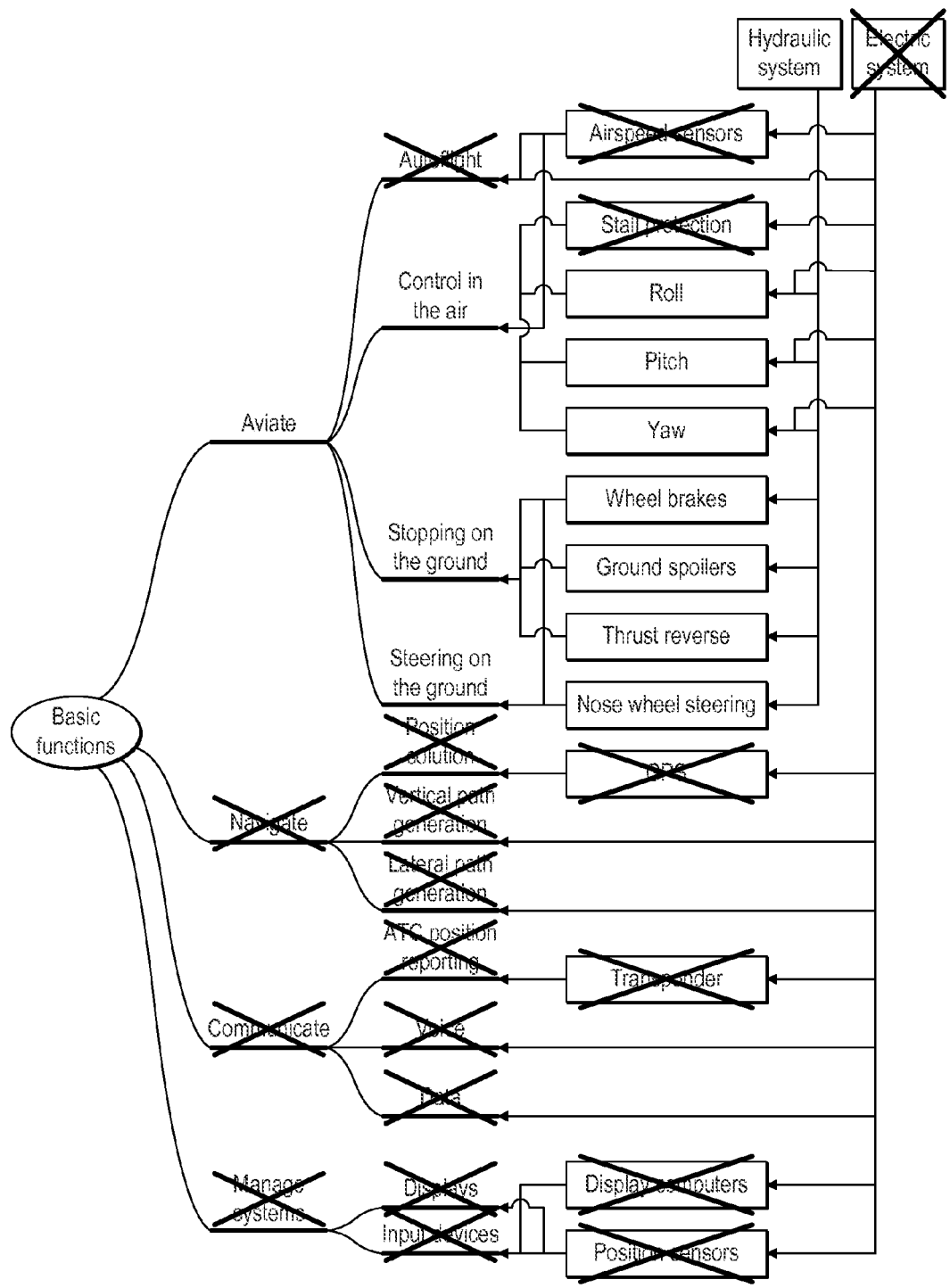
FIG. 5 shows a different example of how failures can lead to certain functionality being unavailable.

FIG. 5 shows a different example of how failures can lead to certain functionality being unavailable. In the example of FIG. 5, a sub-system of the aircraft electric system has failed, leading to a degradation of the "aviate" and "braking on ground" functions and loss of "autoflight", "navigate", "communicate", and "manage systems" functions.

The failure analysis system 10 may comprise a memory 300. The memory 300 stores a list of flight phases or operating modes. These may define the aircraft's 100 mission plan. The memory 300 also stores data indicating which functions are required for each flight phase or operating mode and which sub-systems 101, 102, 103 contribute to those functions. The memory 300 may store priority data for each flight phase or operating mode of the list of flight phases or operating modes. The priority data may indicate a priority level for each of the aircraft functions required for each flight phase or operating mode.

For example, the priority data may indicate priority levels such as those in Table 1.

TABLE 1

| Functions | Flight phase or operating mode | | |
| --- | --- | --- | --- |
| | Take-Off | Cruising | Landing |
| Stopping on runway | High | Low | High |
| Providing Forward Thrust | High | Medium | Medium |
| Maintaining Cabin Environment | Medium | High | Low |

In preferred embodiments, the memory 300 may store a predetermined mission plan for the aircraft. Each segment of the mission plan could be considered to be one or more flight phases or operating modes. Thus, the sub-system required during each segment of the mission plan can be determined from the data stored in the memory 300. The priority level associated with each function may be different for different flight phases or operating modes in the mission plan (as can be seen from the example of Table 1).

A processor 200 communicates with the plurality of monitors 111, 112, 113.

The processor 200 uses the memory 300 and the plurality of monitors 111, 112, 113 to thereby model the response of the sub-systems to a failure determined by the monitors 111, 112, 113. The processor can thereby identify which functions are not available or are degraded (for instance, if one or more redundant sub-systems fail). This may include both functions that are not available or are degraded and are needed at the present time and also functions that are not needed now, but will not be available or will be degraded at a later time when they are needed. The processor is thus arranged to determine whether any of the functions required during one or more of the plurality of tasks is, or will not be, available.

The failure analysis system 10 may also contain a dependency model, which records the dependencies of the sub-systems 101, 102, 103. The model may represent the reliance of each sub-system 101, 102, 103 on each other sub-system (whether monitored or not), and thus allow the failure analysis system 10 to determine when a monitored sub-system 101, 102, 103 or an un-monitored further sub-system 104 cannot support one or more of the airplane functions because of the failure of another sub-system 101, 102, 103, 104.

The dependency model may be stored in the memory 300, or may form part of the processor 200.

The sub-systems 101, 102, 103, the monitors 111, 112, 113, the memory 300, and the processor 200, may all communicate along a single bus 50. Alternatively, and as shown in FIG. 1, the sub-systems 101, 102, 103 communicate along a first bus 50, while the monitors 111, 112, 113, the memory 300, and the processor 200, communicate along a second bus 60 forming part of the failure analysis system 10.

When one or more of the monitors 111, 112, 113, indicate a failure in one or more sub-systems 101, 102, 103 the failure analysis system 10 may use the dependency model to determine which of the monitored sub-systems 101, 102, 103 and/or un-monitored further sub-systems 104 cannot provide its functions.

The failure analysis system 10 may determine which of the functions required for the mission plan stored in the memory 300 cannot be provided or is degraded.

The failure analysis system 10 may thereby identify an alert or a set of alerts to provide to a user of the aircraft 100. Preferably, the alert(s) indicate the functions that are not available due to the failure of one or more sub-system(s) 101, 102, 103, 104. This approach is different from the current approach of merely showing which sub-systems have failed and then requiring the operator (pilot) to determine which aircraft functions are affected.

More preferably, the alert(s) also indicate the flight phases or operating modes that the function is associated with.

Preferably, the failure analysis system 10 uses the priority level associated with the functions required during each of the flight phases or operating modes to identify an order in which the set of alerts should be displayed.

The failure analysis system 10 may store, for example in memory (300), one or more actions to be taken by a user of the monitored system 100 in response to loss or degradation of aircraft functions caused by failures of one or more sub-systems 101, 102, 103, 104.

The failure analysis system may comprise a display device for providing alerts. Alternatively, the failure analysis system may comprise a human-computer interface for providing alerts. The human-computer interface may be a control and display device.

Figure 2:
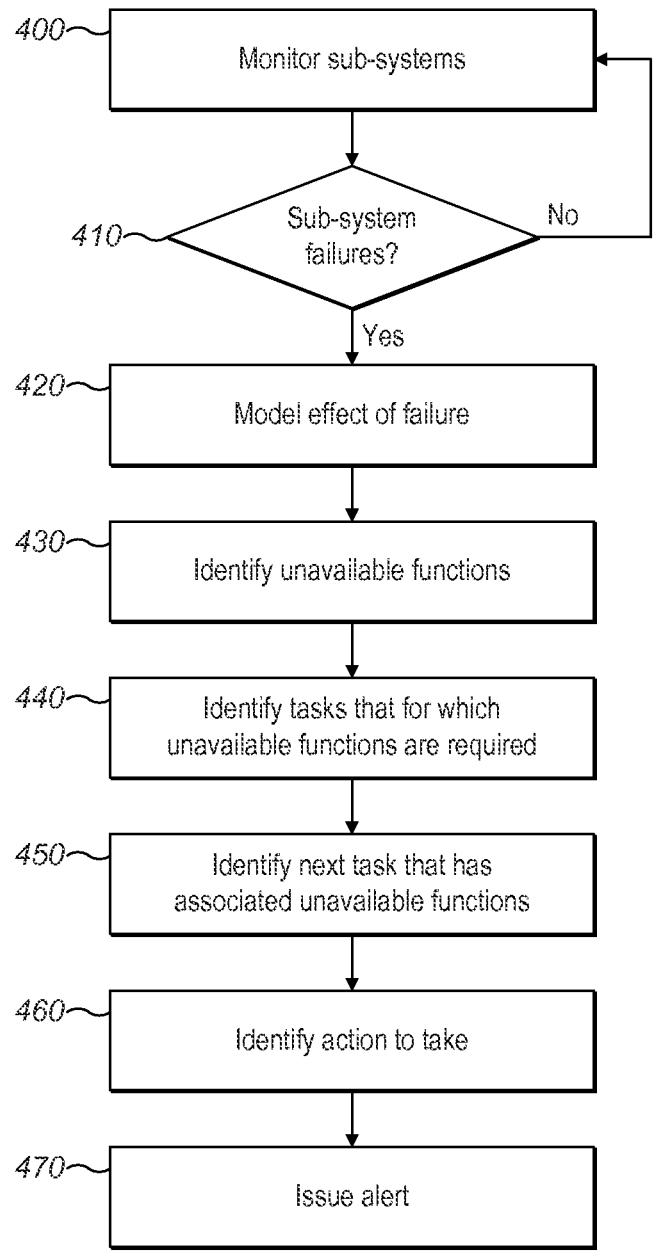
FIG. 2 shows a flow chart of a failure analysis method.

FIG. 2 shows a flow chart of a failure analysis method.

In step 400, one or more monitors 111, 112, 113 monitor the status of one or more sub-systems 101, 102, 103.

If in step 410 it is determined that all sub-systems are operational 101, 102, 103, then the method returns to step 400.

If in step 410 it is determined that a failure has occurred in one or more sub-systems 101, 102, 103, then the method progresses to step 420.

In step 420, the failure analysis system 10 may use the dependency model to determine which other sub-system(s) 101, 102, 103, 104 the failure will affect. That is, the system may identify which other sub-system(s) 101, 102, 103, 104, rely upon the failed sub-system either directly or indirectly (for example, if the sub-system's power source is lost or removed). This step can identify one or more sub-system(s) 101, 102, 103, 104 that cannot perform correctly because of the determined failure, i.e. even if they are not faulty.

In step 430, the failure analysis system 10 identifies from the affected sub-system(s) 101, 102, 103, 104 which aircraft functions are degraded or are not available.

In step 440, the failure analysis system 10 identifies the flight phases or operating modes from the ordered list of tasks that require the unavailable function(s).

In step 450, the failure analysis system 10 identifies the next flight phase or operating mode in the ordered list of flight phases or operating modes for which a function is not available. Optionally, the system may identify the unavailable or degraded function with the highest priority level in the next flight phase or operating mode for which a function is degraded or is not available.

Optionally, in step 460, the system identifies one or more actions associated with the failures determined in step 410 or associated with the unavailable or degraded function identified in step 450 to be taken by the user of the monitored system 100.

In step 470, the failure analysis system 10 may issue an alert to a user of the monitored system 100.

The alert may be a single alert displaying the identified unavailable or degraded function (and, optionally, the identified unavailable or degraded function having the highest priority). Alternatively, the alert may be a list of alerts displaying the identified unavailable functions ordered based upon the order of the flight phases or operating modes (and, optionally, based upon the priority associated with the unavailable function).

The alert may be accompanied by an indication of an action to be taken by a user of the monitored system 100 identified in optional step 460.

Although depicted in FIG. 1 such that the failure analysis system 10 forms a single device, embodiments are envisaged in which the monitors 111, 112, 113 are located on the monitored system 100, but one or both of the processor 200 and memory 300 are located at a remote location and communicate with the monitors 111,112,113 (for example, wirelessly).

In such embodiments, a single device may provide the processor 200 and memory 300 for multiple remote monitored systems 100.

We claim:

1. A failure analysis system for monitoring sub-system failures in an aircraft, the system comprising:

a plurality of monitors to monitor status of at least one sub-system of the aircraft, and to determine if a failure of at least one of the at least one sub-system has occurred;

a memory to store a list of a plurality of flight phases or operating modes to be completed by the at least one sub-system and to store data associating at least one function, which is associated with at least one of the at least one sub-system, with each of the flight phases or the operating modes; and a processor to communicate with the plurality of monitors and the memory, and to model a response of at least one of the at least one sub-system to a failure determined by the monitors to identify which of the at least one function required by the flight phases or the operating modes is degraded or is not available, wherein when a plurality of the at least one function is not available, a human-computer interface produces an alert indicating that at least one of the at least one function associated with a next flight phase or operating mode is degraded or is not available.

2. The system of claim 1, wherein the list of the plurality of flight phases or the operating modes is an ordered list representing a mission plan.

3. The system of claim 2, wherein the aircraft comprises at least one un-monitored sub-system, which is not monitored by the plurality of monitors; and the processor is further to model a response of at least one of the at least one un-monitored sub-system to a failure determined by the monitors of at least one of the at least one sub-system to identify which of the at least one function is not available.

4. The system of claim 3, wherein the system further comprises the human-computer interface to indicate that at least one of the at least one function is not available or is degraded.

5. The system of claim 1, wherein the human-computer interface is to display a list of alerts ordered in dependence upon an order of the flight phases or the operating modes stored in the memory.

6. The system of claim 5, wherein the memory is further to store for each of the flight phases or the operating modes a priority level for at least one of the at least one function associated with the flight phase or the operating mode; and wherein when more than one of the at least one function is degraded or is not available, the human-computer interface produces an alert indicating the at least one function that is degraded or not available having a highest priority level and indicating the associated next flight phase or operating mode for which the at least one function is not available.

7. The system of claim 6, wherein the human-computer interface is further to alert a user of an action to take when at least one of the at least one function is unavailable.

8. The system of claim 7, wherein the memory is further to store an order in which the plurality of the flight phases or the operating modes are to be carried out;

wherein the processor is further to determine when more than one of the at least one function associated with at least one of the flight phases or the operating modes is not available; and wherein when more than one of the at least one function is unavailable, the human-computer interface is to produce an alert indicating an action to take in relation to a next task for which the at least one function is unavailable.

9. The system of claim 8, wherein the memory is further to store an order of importance of the plurality of flight phases or the operating modes; and wherein the processor is to determine when more than one of the flight phases or the operating modes cannot be carried out; and wherein when more than one of the at least one function associated with at least one of the flight phases or the operating modes is degraded or is not available, the human-computer interface is to produce an alert indicating an action to take in relation to the at least one function that is degraded or unavailable having the highest associated priority level for the next flight phase or the next operating mode for which the at least one function is unavailable.

10. A failure analysis method for monitoring sub-system failures in an aircraft, the method comprising:

storing a list of a plurality of flight phases or operating modes to be completed by the aircraft and storing data associating at least one function with each of the flight phases or the operating modes;

monitoring, by a plurality of monitors, at least one sub-system of the aircraft, wherein the at least one function is associated with at least one of the at least one sub-system;

determining a failure of at least one of the at least one sub-system;

modelling a response to at least one of the at least one sub-system to the failure;

identifying which of the at least one function is not available or is degraded;

determining whether at least one of the at least one function associated with each of the plurality of flight phases or the operating modes is degraded or not available; and issuing an alert based on at least one of the at least one function that is not available or is degraded.

11. The method of claim 10, wherein the list of the plurality of flight phases or the operating modes is an ordered list representing a mission plan.

12. The method of claim 11, wherein the method further comprises:

identifying a next flight phase or operating mode in the ordered list for which at least one of the at least one function is not available or is degraded.

13. The method of claim 12, wherein the method further comprises issuing a list of alerts based on an order of the flight phases or the operating modes in the ordered list.

14. The method of claim 12, wherein the method further comprises identifying at least one action to be taken in relation to at least one of the at least one function that is degraded or not available, wherein the alert is accompanied by an indication of the at least one action that is identified.

15. The method of claim 13, wherein the method further comprises identifying at least one action to be taken in relation to at least one of the at least one function that is degraded or not available, wherein each of the alerts in the list is accompanied by an indication of the at least one action that is identified.

16. The method of any one of claim 15, wherein the aircraft comprises at least one un-monitored sub-system that is not monitored by the plurality of monitors, and wherein the method further comprises modelling a response of at least one of the at least one un-monitored sub-system to a failure of at least one of the at least one sub-system determined by the monitors.

* * * * *